Aug. 6, 1946.  G. H. BIERMAN  2,405,178
SOLDERING MACHINE
Filed Jan. 23, 1943  2 Sheets-Sheet 2

INVENTOR.
George H. Bierman
BY Ivan D. Thornburgh
Charles H. Erne
ATTORNEYS

Patented Aug. 6, 1946

2,405,178

UNITED STATES PATENT OFFICE 2,405,178

SOLDERING MACHINE

George H. Bierman, River Forest, Ill., assignor to American Can Company, New York, N. Y., a corporation of New Jersey Application January 23, 1943, Serial No. 473,379

5 Claims. (Cl. 113—60)

The present invention relates to soldering machines for sealing the side seams of sheet metal can bodies and has particular reference to preventing the accumulation of mush metal in molten solder retained in a solder bath.

In can making practice, the side seams of sheet metal can bodies are soldered usually by passing the can bodies along a solder roll which rotates in a bath of molten solder. In such a solder bath considerable solder dross or mush metal accumulates on the surface of the molten solder adjacent the roll. "Mush metal" is a term used in can manufacture to designate the thick by-product of lead and tin of the solder which combines with iron and other impurities in the solder bath. It is not a soldering agent.

As the rotating solder roll carries up the solder from the bath to the passing can bodies, it also carries up some of the dross. When sufficient dross and mush metal accumulates it tends to wipe the solder off the roll and interferes with the proper application of the solder to the side seams of the can bodies.

The instant invention contemplates overcoming this difficulty by providing a solder bath having a predetermined novel shape which when used with circulating devices eliminates the accumulation of mush metal in the bath.

An object therefore of the invention is the provision of a can body soldering machine having a solder bath wherein the shape of the bath and the circulating devices located in the bath cooperate in such a manner as to minimize the accumulation of mush metal within the bath.

Another object is the provision in such a soldering machine of buoyant rotating devices disposed within the solder bath for agitating the molten solder contained therein to prevent the accumulation of mush metal.

Numerous other objects and advantages of the invention will be apparent as it is better understood from the following description, which, taken in connection with the accompanying drawings, discloses a preferred embodiment thereof.

Referring to the drawings.

Figure 2:
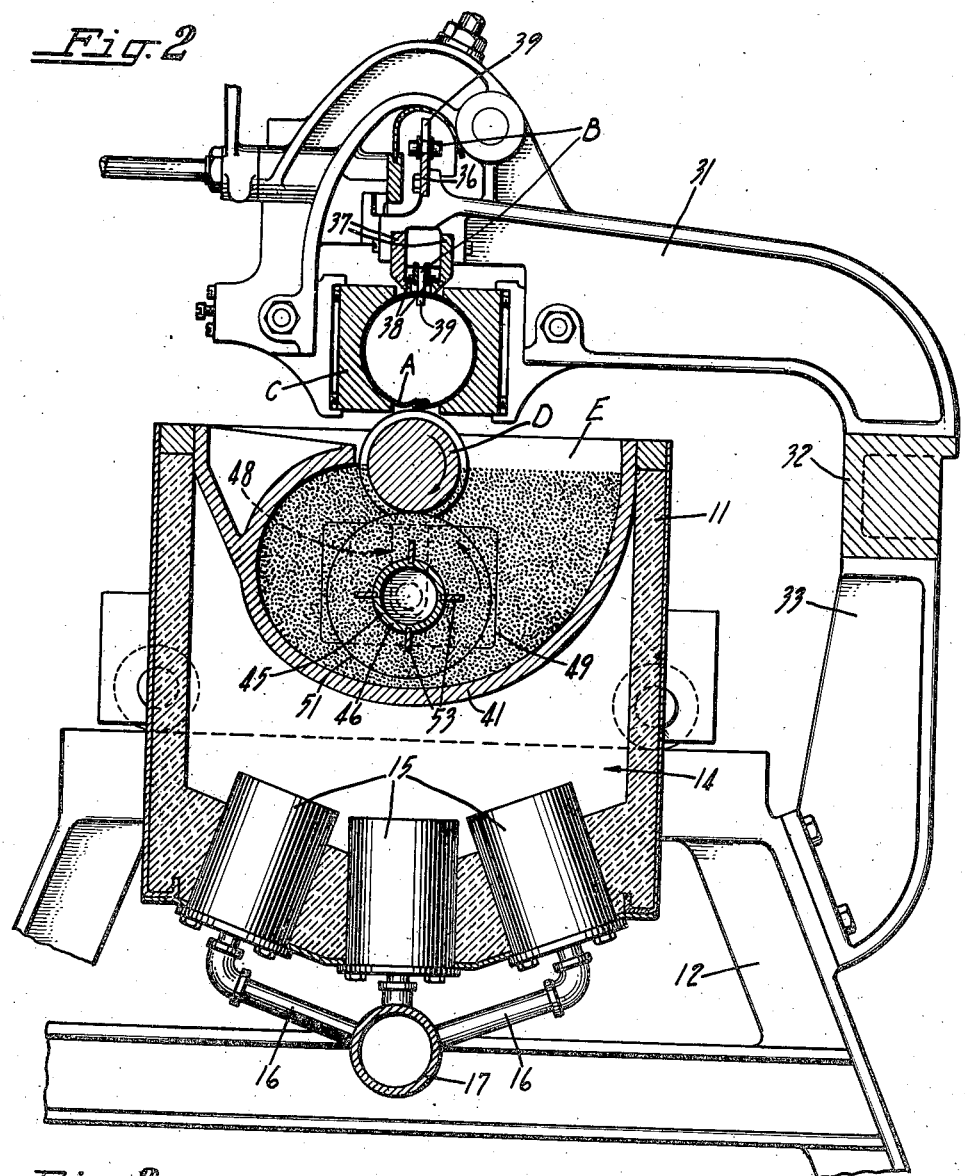
Fig. 2 is an enlarged transverse section taken substantially along the line 2—2 in Fig. 1.

As a preferred embodiment of the invention the drawings illustrate principal parts of a soldering machine in which molten solder is applied to the side seams of sheet metal can bodies A (Fig. 2). In such a machine the can bodies are propelled endwise, by an endless chain conveyor B, through an outside horse C with the side seams of the bodies in engagement with a rotating solder roll D disposed in a solder bath or reservoir E. This is a usual can body side seam soldering machine construction.

Figure 1:
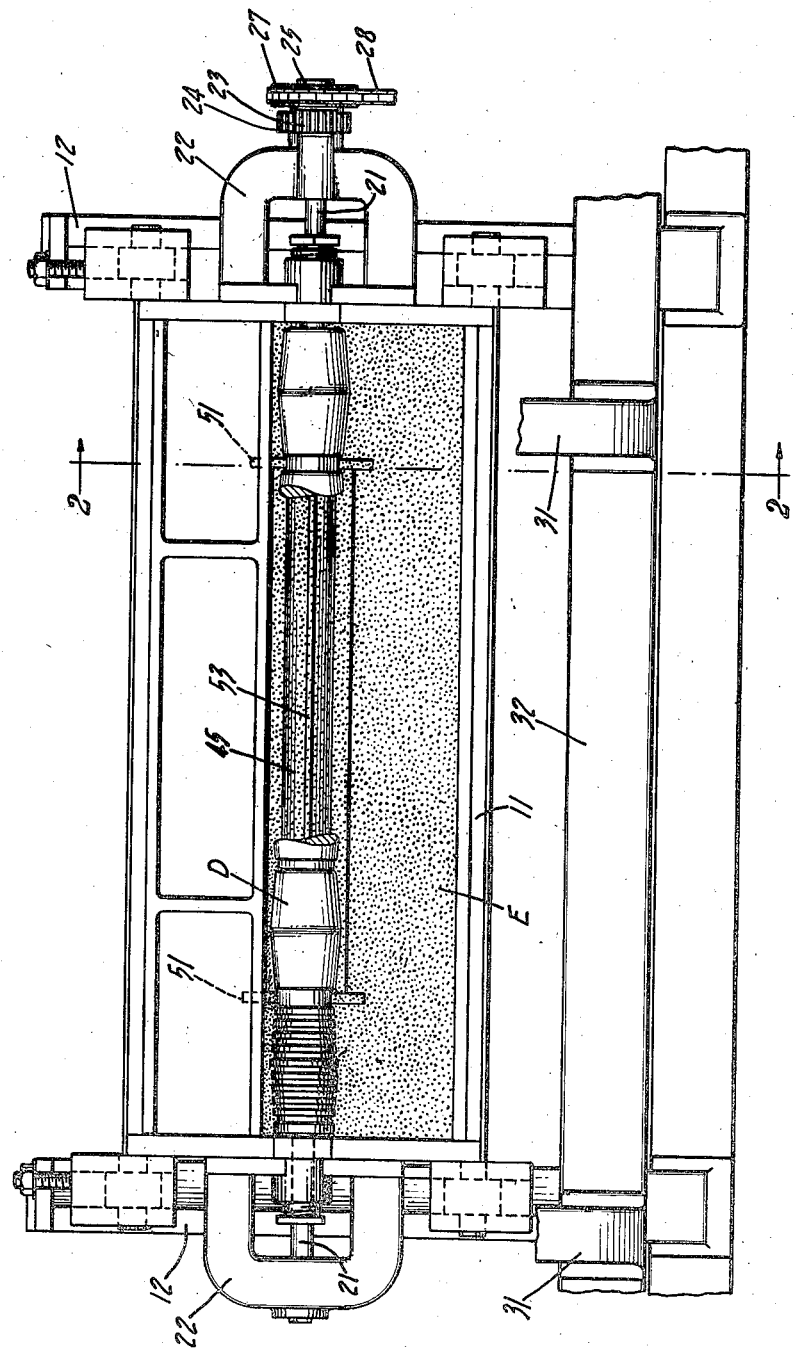
Figure 1 is a top plan view of a soldering machine embodying the instant invention, with parts broken away.

The solder reservoir E is located in a housing 11 which is supported on frame legs 12 (Figs. 1 and 2) disposed at each end of the housing. The housing encloses a combustion chamber 14 which is located directly below the reservoir and which is heated by a plurality of gas burners 15 secured in the housing for maintaining the solder in the reservoir in a molten condition. These burners are connected by pipes 16 to an intake manifold 17 which leads from any suitable source of supply of gas.

The solder roll D extends longitudinally of the reservoir E and is formed with trunnions 21 (Fig. 1) which are journaled in bearing brackets 22 bolted to the ends of the reservoir housing 11. The roll D is continuously rotated by a spur gear 23 which is mounted on one of the trunnions. This gear is driven by a gear 24 mounted on a stud shaft 25 located below the solder roll trunnion and threadedly secured in the housing 11. The gear 24 is rotated by a sprocket 27 which is fastened to the gear and which is driven by an endless chain 28. The chain is driven in any suitable manner from an outside source of power.

The horse C extends parallel with the solder roll D and is disposed directly above the solder roll. This horse is supported on overhanging brackets 31 (Figs. 1 and 2) which are bolted to a longitudinal rail 32 carried on frame brackets 33 bolted to the frame legs 12.

The conveyor B operates over a pair of spaced sprockets located at the ends of the machine and one of these sprockets serves as a driving sprocket. Intermediate the sprockets the chain is supported on guide rails. The upper run of the chain rests on a longitudinal guide rail 36 while the lower run of the chain is supported by a pair of spaced and parallel track rails 37, these rails providing tracks for rollers 38 carried on the chain at spaced intervals. Feed fingers 39 carried by the chain engage behind the can bodies in the usual manner and propel them through the horse C.

Provision is made in the solder reservoir E for preventing the accumulation of mush metal adjacent the solder roll D. For this purpose the cross-sectional shape of the reservoir is formed in a nearly hyperbolic curve. In other words, the bottom wall (indicated by the numeral 41) of the reservoir is curved in the shape of a hyperbola, the curvature beginning at the top outer edge of the reservoir and curving downwardly toward the bottom and thence continuing upwardly in a sharper curve toward the solder roll. This curved wall member 41 terminates adjacent and close up to the side of the solder roll substantially in the horizontal plane extending through the axis of the roll.

It has been found through extensive experimentation that this particular shape of solder reservoir permits of the best natural circulation of the solder throughout the reservoir. The sharply curved portion of the wall member 41 besides providing for this essential circulation also covers the solder on the ascending side of the roll as the solder is carried up onto the can body (the roll rotating in the direction of the arrow shown in Fig. 2). This construction largely confines the solder from exposure with the outside atmosphere on that side of the reservoir. The solder surface on the other side of the roller is largely protected from the atmosphere by the usual film of liquid flux which floats on the bath. This shielding on the ascending side of the solder roll prevents oxidation of the solder and greatly retards the formation of mush metal adjacent the roll.

Figure 3:
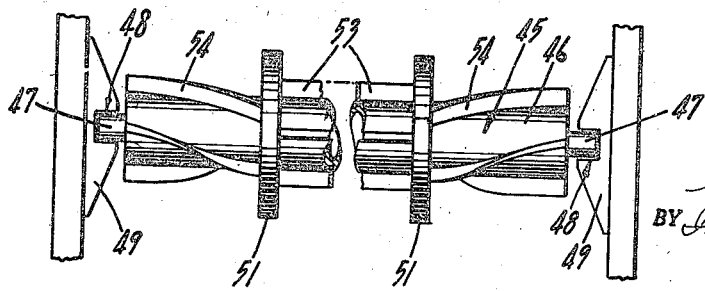
Fig. 3 is an enlarged plan detail of an agitating device used in the machine.

In order to better circulate the solder by accelerating its flow throughout the reservoir, a rotating hollow paddle wheel 45 (Figs. 1, 2, and 3) is submerged in the solder in the reservoir. This paddle wheel extends parallel with the solder roll D and is located directly under the roll. The wheel is formed with a long hollow tubular body 46 having at its ends trunnions 47 which operate in vertical grooves 48 formed in bearing blocks 49 disposed inside the reservoir and bolted to the ends thereof.

Near the ends, the paddle wheel 45 is formed with actuating or driving discs 51 which surround the wheel body 46. This paddle wheel is of iron or similar metal and through the buoyant action of the solder the wheel is forced upwardly, its discs frictionally engaging against the solder roll. Hence, through these discs the rotation of the solder roll is imparted to the paddle wheel.

Between the actuating discs 51, the paddle wheel 45 is formed with a plurality of straight longitudinal blades 53 which are set into the wheel body 46. Between the discs and the trunnions 47, the wheel is formed with a plurality of short curved or helical blades 54. The blades at the two ends of the wheel are set into the wheel body in such a position as to draw the solder inwardly from the sides of the reservoir toward the middle of the mass of solder as the paddle wheel rotates. The angle of the blades may be reversed, if desired, and in either case this sets up an accelerated swirling action of solder in the reservoir. The straight blades merely agitate the solder in the middle of the mass.

It is this action of the paddle wheel 45 that keeps the solder thoroughly agitated and that maintains it in constant circulation throughout the reservoir. This is in addition to and augments the promoted circulation of the solder caused by the rotating solder roll in conjunction with the described specific configuration or curvature of the reservoir. In this manner mush metal or other impurities and dross in the solder is prevented from accumulating at any one place and is therefore maintained under control. It will be understood that the term "mush metal" is used in the broad sense to designate impurities in the bath which may interfere with proper soldering. Any small amount that is produced will not be sufficient to interfere with the carrying up of the solder from the reservoir onto the can body side seams as the bodies move along the solder roll.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body side seam soldering machine, the combination of a rotatable solder roll for applying molten solder to can bodies, a reservoir for retaining a supply of the molten solder and in which said solder roll is rotated, and a hollow paddle wheel rotatably mounted in said reservoir adjacent said solder roll and having frictional engagement with said solder roll by reason of its buoyancy in the solder so that said wheel is rotated by said solder roll for agitating the solder to control the accumulation of mush metal therein.

2. In a can body side seam soldering machine, the combination of a rotatable solder roll for applying molten solder to can bodies, a reservoir for retaining a supply of the molten solder and in which said solder roll is rotated, a hollow paddle wheel having a plurality of blades thereon and rotatably mounted in said reservoir adjacent said solder roll, and a plurality of driving discs on said paddle wheel and having frictional engagement with said solder roll by reason of its bouyancy in the solder so that the paddle wheel is rotated thereby to agitate and circulate the solder in the reservoir to minimize and control the accumulation of mush metal therein.

3. In a can body side seam soldering machine, the combination of a rotatable solder roll for applying molten solder to can bodies, a reservoir for retaining a supply of the molten solder and in which said solder roll is rotated, a hollow paddle wheel longitudinally and rotatably mounted in said reservoir adjacent said solder roll so that it is bouyed up into frictional engagement with said solder roll by reason of the bouyant action of said solder and is rotated thereby, a plurality of longitudinal straight blades disposed on said paddle wheel, and a plurality of curved blades also located on the paddle wheel adjacent the ends thereof, said straight blades being adapted to freely circulate the solder through said reservoir and said curved blades being adapted to set up a swirling action in the solder adjacent the ends of the reservoir for agitating and circulating the solder to minimize and control the accumulation of mush metal.

4. In a can body side seam soldering machine having a solder bath with a solder roll rotating therein for circulating and applying molten solder to the side seams of can bodies passing along said roll, the combination with said solder roll of a solder reservoir having side and bottom walls merging into each other and providing a unitary smooth curved continuous retaining wall extending transversely of the reservoir to promote free circulation of the solder within the reservoir, said wall along one side of the reservoir curving upwardly and inwardly and terminating close to said roll for minimizing the exposed surface of the solder and for maintaining the solder surface and the solder roll free of undesirable accumulation of mush metal, and a paddle wheel rotatable in said reservoir for accelerating the promoted circulation of solder and to minimize the accumulation of mush metal.

5. In a can body side seam soldering machine having a solder bath with a solder roll rotating therein for circulating and applying molten solder to the side seams of can bodies passing along said roll, the combination with said solder roll of a solder reservoir having a unitary smooth curved continuous retaining wall to promote free circulation of the solder within the reservoir, said wall at one side of the reservoir curving upwardly and thence inwardly over the reservoir in engagement with and closely covering the solder adjacent said roll to direct mush metal in the solder moved toward it away from the roll, the under surface of the inwardly curving portion of said wall terminating adjacent said roll below the level of the top thereof for minimizing the exposed surface of the solder to prevent oxidation of the solder and for maintaining the solder surface and the solder roll free of undesirable accumulation of mush metal, and means for rotating said roll upwardly toward said under wall surface.

GEORGE H. BIERMAN.